July 13, 1926.

O. A. FREDERICKSON

ELECTRICAL CONDUIT FITTING

Filed March 5, 1925

1,592,454

INVENTOR
Otto A. Frederickson
by
Harry P. Williams
atty.

Patented July 13, 1926.

1,592,454

UNITED STATES PATENT OFFICE.

OTTO A. FREDERICKSON, OF HARTFORD, CONNECTICUT, ASSIGNOR TO THE AMERICAN WIREMOLD CO., OF HARTFORD, CONNECTICUT, A CORPORATION OF CONNECTICUT.

ELECTRICAL CONDUIT FITTING.

Application filed March 5, 1925. Serial No. 13,034.

Metal conduits for concealing and protecting electric wires that are run upon the outer surfaces of walls and ceilings are commonly made of base strips and channel-shaped caps which are applied to the base strips. These bases and caps are furnished in standard lengths and while all the bases are usually the same cross sectional size the caps are of different heights, depending upon whether they are to cover two or more wires, and the caps, regardless of their height, are shaped to fit the same bases. Metal moldings or conduits have also been made of lengths of one-piece channels of different heights. It is frequently necessary to connect such conduits with boxes or with pipe ends or similar structures, and this invention relates to fittings for that purpose.

It is essential that the passage through such conduits and fittings be practically unobstructed in order that the wires may be freely pushed or fished through the conduits, also that there be no openings between the outer faces of the caps and the fittings which would expose the wires and admit dirt, dust or lint, and further it is required that the fittings and conduits be so joined as to ensure a firm support for the conduits and a complete electrical grounding of the installation.

The object of this invention is to provide a connector fitting having means whereby it may be attached to a box or pipe and a firm, secure and well grounded connection may be made with a conduit end, which fitting is so constructed that it may be used with a cap or channel of small size without leaving any opening between the outer face of the cap and the fitting, or may be used with a cap or channel of large size without offering any obstruction to the passage of wires through the interior of the conduit.

This object is attained by providing a thimble with a male thread and a nut by which the fitting may be secured to a box, or with a female thread for attachment to a pipe. The thimble at one end has a forwardly projecting tongue that is designed to make firm and sure connection with a conduit, and it has a thin web partially closing the opening through the thimble at the tongue end, which web is left in place when the fitting is used with a conduit of small size but is broken away when the fitting is used with a conduit of large size.

Figure 1:
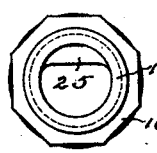
Figure 2:
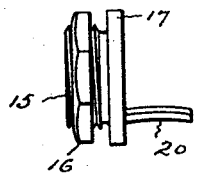
Figure 3:
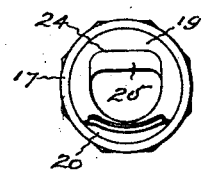
Figure 4:
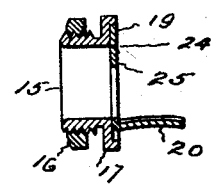
Figure 5:
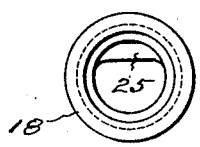
Figure 6:
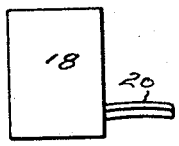
Figure 7:
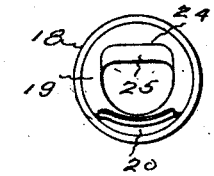
Figure 8:
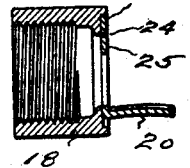
Figure 9:
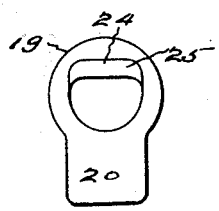
Figure 10:
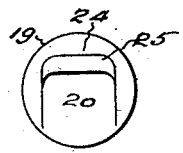
Figure 11:
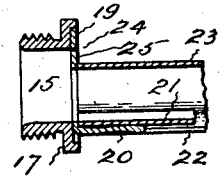
Figure 12:
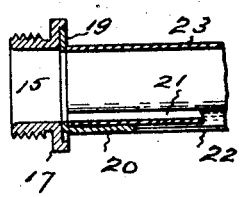
Figure 13:
Figure 14:
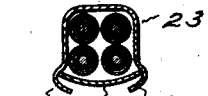
Figure 15:
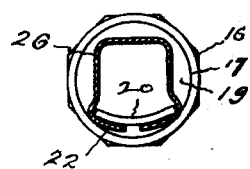

In the accompanying drawings Fig. 1 is a view looking at one end of a box connector. Fig. 2 shows a side view of the box connector. Fig. 3 is a view of the other end of the box connector. Fig. 4 shows a section of the box connector. Fig. 5 is a view of one end of a pipe connector. Fig. 6 shows a side view of the pipe connector. Fig. 7 is a view of the other end of the pipe connector. Fig. 8 is a section of the pipe connector. Fig. 9 shows one form of tongue plate that may be used with either connector. Fig. 10 is a view of another form of tongue plate. Fig. 11 is a section of a fitting connected with the end of a two-piece conduit having a small cap. Fig. 12 is a section of a fitting connected with a conduit having a large cap. Fig. 13 is a section of a conduit with the small cap containing two wires. Fig. 14 is a section of a conduit having a large cap and containing four wires. Fig. 15 is a transverse section of a single conduit showing it attached to a pipe connector.

The box connector illustrated has a thimble 15 with a male thread on which turns a nut 16. For connecting this form with a box the threaded section is thrust through an opening and the wall of the box clamped between the flange 17 and the nut, as will be readily understood. The pipe connector thimble 18 has a female thread by means of which the fitting may be screwed upon a pipe, nipple or circular conduit.

At one end of these thimbles is a plate 19. This plate may be set into the end of the thimble and the edge of the hub formed over the edge of the plate. Extending outwardly from the edge of the plate is a tongue 20 which is designed to be thrust under the base strip 21, with its edges between the bottom of the base strip and the in-turned edges 22 of the cap 23 that is fitted upon the base strip, if used with a two-piece conduit. If used with a one-piece channel 26, the tongue is merely thrust into the base of the channel, as illustrated in Fig. 15. The opening through the plate is normally the same size and shape as the cross sectional area of the opening in a small cap or a small channel so that when the tongue is thrust under the base strip or into the channel for connecting the fitting with the conduit there will be no opening into the passage for the wires from the outside of the small cap, and there will be no obstruction in the interior, as illustrated in Fig. 11.

The plate is scored as at 24 so that the web 25 may be easily twisted out or broken away and thus leave no obstruction through the interior when the fitting is to be connected with a channel of large size or a conduit having a large size cap, as illustrated in Fig. 12.

The tongue may be blanked from the metal on the outer edge of the plate as illustrated in Fig. 9 and then bent upward, or the tongue may be punched from the interior of the plate as shown in Fig. 10 and then bent down.

This invention avoids the necessity of providing two or more sizes of connectors, for one size of connectors may be used with channels or caps of large or small size. The construction enables the installer of the system to connect the parts so that there will be no opening into the fitting exterior of a channel or cap of small size or no obstruction in the interior when the fitting is used with a large size channel or cap.

The invention claimed is:—

1. An electrical conduit fitting comprising a thimble having an axially extending tongue at one end shaped to engage a conduit, and a scored web extending across a section of the opening through the thimble at the tongue end, said opening normally being of a size and shape of the cross sectional area of a conduit with which the fitting is to be used and said opening when the web is removed being of the size and shape of the cross sectional area of a larger sized conduit.

2. An electrical conduit fitting comprising a thimble having means for attachment to a receptacle, a tongue extending axially from the thimble, a plate fixed to the tongue end of said thimble, said plate having a scored section that closes part of the opening through it, said opening normally being of the size and shape of the cross sectional area of a conduit with which the fitting is to be used, and said opening when the scored section is removed being of the size and shape of the cross sectional area of a larger sized conduit.

3. An electrical conduit fitting comprising a thimble having means for attachment to a receptacle, a plate fixed to the end of said thimble, said plate having a tongue bent from one edge and extending axially of the fitting, and a scored web that closes part of the opening through the plate, said opening normally being of the size and shape of the cross sectional area of a conduit with which the fitting is to be used, and said opening when the web is removed being of the size and shape of the cross sectional area of a larger sized conduit.

4. An electrical conduit fitting comprising a tubular thimble, a tongue extending axially of the thimble at one end, and a web that closes part of the opening through the thimble at the tongue end, said web being weakened so that it may be removed to increase the size of the opening into the thimble, said opening when the web is in place being of a size and shape of the cross section of a small conduit, and said opening when the web is removed being of the size and shape of a large conduit.

OTTO A. FREDERICKSON.